United States Patent Office 3,070,748
Patented Dec. 25, 1962

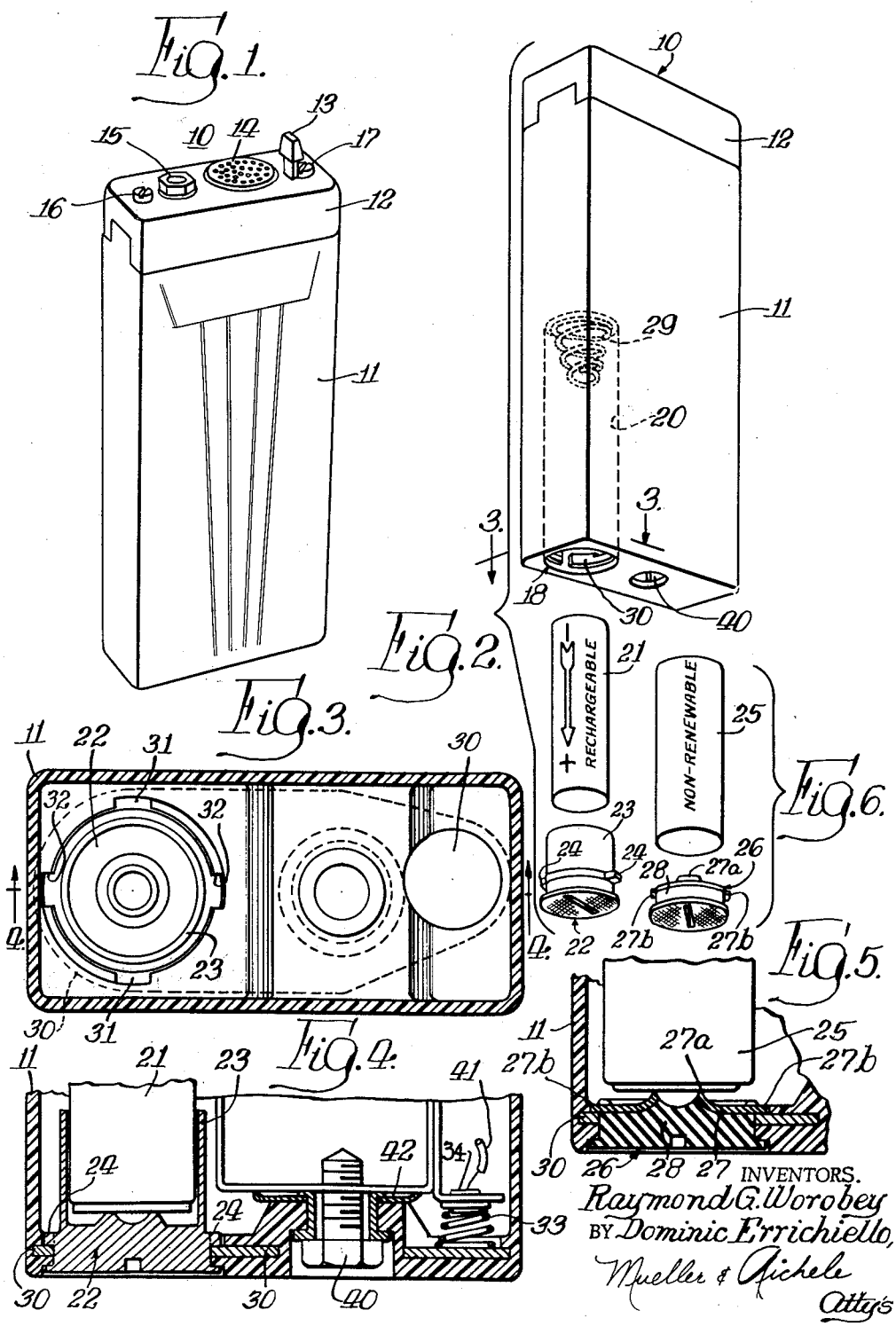

3,070,748
PORTABLE RADIO RECEIVER HAVING INTERCHANGEABLE MEANS FOR USING SINGLE-USE AND RECHARGEABLE BATTERIES
Raymond G. Worobey, Stickney, and Dominic Errichiello, Melrose Park, Ill., assignors to Motorola, Inc., Chicago, Ill., a corporation of Illinois
Filed Apr. 14, 1961, Ser. No. 103,031
4 Claims. (Cl. 325—492)

This invention relates in general to self-contained electrical devices such as radio receivers of the so-called pocket type, and more particularly to such devices adaptable for operation from both single-use disposable batteries as well as rechargeable type batteries which may be recharged while within the radio housing.

In certain commercial applications it has been found advantageous to provide a portable device of the personal or miniature type, e.g., radio receivers for use in selective one-way paging systems. One such receiver of this type is described and claimed in Patent No. 2,924,705 issued to Donald R. Jones and assigned to the assignee of the present invention. It is therefore desirable to provide such a receiver as an entirely self-contained unit with antenna and power source being contained within the receiver housing without external wires or connections.

Because of the inherent small size, previous devices of this type have presented a problem in the replacement of batteries. Usually, the entire housing required dismantling to gain access to the battery compartment. Further, in most cases, such devices were intended for operation from a single-use type battery such as the conventional dry electrolytic flashlight type or the mercury cell type. Others, while incorporating the desirable provision of operating from a rechargeable type battery, encounter the disadvantage of requiring battery removal before recharging.

It is therefore an object of the present invention to provide a pocket-size electrical apparatus having provisions for convenient battery replacement without the necessity of dismantling the apparatus housing.

Another object of the invention is to provide a portable battery powered device arranged for interchangeable use between single-use and rechargeable type batteries without modification.

A further object is to provide a housing for a battery operated device having provisions for recharging of a rechargeable type battery without removing it from the associated housing and for effectively preventing inadvertent charging of the single-use type battery when being used.

A feature of the invention is the provision of an electrical device which includes a cylindrical compartment extending lengthwise along one side of the housing thereof and having an opening from the bottom side for interchangeably receiving both single-use type and rechargeable type batteries. A battery cap-cover is rotatably received within such opening to secure the battery within the radio housing.

Another feature of the present invention is the provision of a battery powered portable device having a rechargeable type battery within the housing thereof, with a battery cap-cover of conducting material connecting one pole of the battery and a conducting terminal on the housing connected to the other pole of the battery, whereby electrical continuity may be established between the battery poles and an external power source.

Still another feature of the invention is the provision of a battery powered portable device having a single-use type battery within the housing thereof, with a battery cap-cover of substantially non-conducting material to effectively prevent inadvertent charging of the single-use type battery by insulating one of the battery poles from electrical contact with any external power source.

A further feature is the provision of a battery powered portable device having a battery within the housing thereof, with a battery cap-cover of conducting material connecting one pole of the battery and a conducting terminal connected to the other pole of the battery, both the cap-cover and terminal being recessed within the non-conducting housing to prevent short-circuiting of the battery if the portable device is placed in a standing position on a conductive surface.

The invention is illustrated in the accompanying drawings in which:

FIG. 1 is a perspective view of the assembled receiver of the present invention;

FIG. 2 is a perspective view of the receiver with battery and cap-cover removed;

FIG. 3 is a top cross section view showing the notched conducting plate and contact terminal taken along lines 3—3 of FIG. 2;

FIG. 4 is a partial side cross section view showing the rechargeable battery and cap-cover within the housing;

FIG. 5 is a partial side cross section view showing the single-use battery and cap-cover within the housing; and FIG. 6 is a perspective view of the single-use battery and cap-cover therefor.

In practicing the invention, a radio receiver is provided with a housing which has a cylindrical compartment extending lengthwise along one of its sides with an opening from the bottom for interchangeably receiving either a single-use type or a rechargeable type battery. The standard single-use battery has a diameter larger than that of the rechargeable type battery. A battery cap-cover is rotatably received within such opening to secure the battery within the housing. The cap-cover includes side flanges cooperating with a notched conducting plate internally disposed and positioned around the compartment opening. One such battery cap-cover is constructed of conducting material and includes an extended tubular portion having internal dimensions for receiving the rechargeable type battery but which is too small to receive the single use battery. Another battery cap-cover is provided for use with a single use battery which includes a conducting member internally imbedded in a non-conducting material. A conducting contact terminal is further provided disposed adjacent the compartment opening. With the conducting cap-cover electrically connected to one pole of the rechargeable battery and the conducting terminal electrically connected to the opposite battery pole, an external power source may be coupled thereto to recharge the battery while it is within the housing. With the cap-cover of non-conducting material insulating the battery pole of the single-use type battery, inadvertent charging of the same is effectively prevented.

Referring to the drawings, FIG. 1 shows a perspective view of the pocket radio receiver 10 as encased in a plastic housing 11 and a metal top 12, with appropriate controls being available from the top. A slide-type switch 13 is provided to turn an internal loudspeaker on and off with grill 14 provided to pass sound from this loudspeaker. Jack 15 is also provided for use when it is desirable to incorporate an earphone in lieu of using the loudspeaker. Screws 16 and 17 hold the housing 11 and top 12 in assembled relation.

FIG. 2 is a perspective view of the housing with the battery removed. Battery compartment 20 is shown in dotted lines as is the resilient base spring 29. Battery compartment 20 will accommodate either the rechargeable type battery 21 or a single-use type battery 25. As indicated graphically in FIGS. 2 and 6, the single-use battery 25 is larger in diameter than the rechargeable battery 21. The battery cap-cover 22 is restricted to use with the rechargeable battery 21 only as the internal dimension of the extended tubular portion 23 thereof is intentionally made so as not to accommodate the single-use battery 25.

In assembling, extended tubular portion 23 of battery cap-cover 22 receives a portion of the rechargeable battery 21 and is inserted in opening 18. As best seen in FIG. 3, side flanges 24 are aligned with opposing slots 31 on conducting plate 30. Battery cap cover 22 is depressed inwardly until the side flanges 24 clear the upper edge of conducting plate 30 and then rotated one-half turn until aligned with opposing notches 32. Upon release, resilient base spring 29 forces the battery and cap-cover in an outward direction such that flanges 24 reside in slots 32 thereby securely locking the battery within housing 11. Flanges 24 further make electrical contact with conducting plate 30. Another resilient spring 33 is physically attached to but electrically insulated from the inner mounting chassis 42 by rubber grommet 34 (best shown in FIG. 4). When chassis 42 is secured within housing 11 by screw 40, resilient spring 33 is forced against conducting plate 30 thereby making electrical contact. Lead 41, attached to resilient spring 33, delivers the electrical power of the battery to the electrical components of the radio apparatus and is returned by inner chassis 42 to base spring 29 and thus to the opposite pole of the battery 21. Screw 40 is likewise electrically connected to this latter battery polarity by its direct engagement with conducting inner chassis 42. Screw 40 therefore serves as an external contact terminal for one pole of the rechargeable battery with cap-cover 22 serving as the contact for the other pole. FIG. 4 shows a cross sectional view of the rechargeable battery 21 and associated cap-cover 22 in assembled relation.

Similarly, the single-use battery 25 may be assembled by insertion in compartment 20 wtih associated cap cover 26 cooperating with conducting plate 30 in the manner previously described and further illustrated in FIG. 5 whereby the battery is secured within housing 11. As previously stated, single-use battery 25 is larger in diameter than the rechargeable battery 21. This requires the use of battery cap-cover 26 using battery 25. Cap-cover 26 is constructed of a non-conducting material 28 in which internal member 27 is imbedded. In the assembled relation as shown in FIG. 5, electrical continuity is established between one of the poles of the battery and conducting plate 30 through internal member 27 with portion 27a electrically engaging the battery pole with the portions ending in side flanges 27b electrically engaging conducting plate 30.

For recharging battery 21, it is merely necessary then to provide an external power source electrically connected between cap-cover 22 and contact terminal 40. Current may then flow through the conducting cap cover 22 to one pole of the battery 21 and is returned through conducting chassis 42 connected between the other pole and contact terminal 40. One such arrangement for recharging batteries of this type while within the housing has been devised to accommodate several such portable radio receiver units. Appropriate slots are provided having contact pins which selectively engage cap cover 22 and contact terminal 40 when the radio unit is inserted into a slot. The receiver apparatus is removed after a predetermined time with the battery thus recharged. It will be noted that contact screw 40 and battery cap-cover 22, when received in opening 18 in assembled relation, are recessed within housing 11. This provides convenient protection from inadvertently short-circuiting the rechargeable battery 21 if the radio apparatus 10 is placed in a standing position on a conductive surface.

Since the single-use battery 25 can only be used in association with cap cover 26, it may be readily seen that inadvertent charging of the single use battery 25 is thereby effectively prevented. Electrical continuity is internally provided between the battery and conducting plate 30 by internal member 27. A connection between the battery and an external charging power source is prevented by reason of the interposition of the non-conducting material 28 which acts as an insulator.

It may thus be seen that a pocket-type radio receiver apparatus is provided with the convenience of accomplishing battery replacements without dismantling the radio housing. Provisions are made to interchangeably receive both a single-use type battery and rechargeable type battery without modification. Further, provisions are made to recharge the rechargeable battery while within the radio housing and to prevent inadvertent charging of a single use battery when being used.

We claim:

1. In an apparatus having power consuming electrical components for operation from a self-contained battery source, a housing for such electrical components including an open-ended cavity for interchangeably receiving a single-use battery of a first diameter and a rechargeable battery having a diameter smaller than that of said single-use battery, and means for recharging said chargeable battery while within said housing, said means including a battery cover cap of conducting material having side flanges and an extended tubular portion, a conducting plate contained within said housing member and positioned around said cavity opening, and a conducting contact disposed adjacent to said cavity opening and projecting inwardly through said housing, said cover cap being adapted to receive a portion of said rechargeable battery within said tubular portion thereof and to make electrical contact with one pole thereof, with said side flanges cooperating with said conducting plate for securing said battery within said housing member and to make electrical contact with said conducting plate, said contact having an electrical connection with the opposing pole of said rechargeable battery, whereby said rechargeable battery may be recharged by an external power source electrically engaging said conducting contact and said conducting cover cap.

2. In a portable apparatus having power consuming electrical components for operation from a self-contained battery source provided by either a single-use battery of a first diameter or a rechargeable battery having a diameter smaller than that of said single-use battery, a housing for enclosing said apparatus as a self-contained unit having an open-ended cavity for interchangeably receiving a battery, means for recharging said rechargeable battery while within said housing including a metallic battery cover-cap having an extended tubular portion, conducting means positioned adjacent said cavity opening, and a conducting contact disposed aljacent said cavity opening and projecting inwardly through said housing, said cover cap being adapted to make contact with one pole of the battery with said tublar portion thereof having internal dimensions for receiving a portion of the rechargeable battery, said cover-cap acting to secure said battery within said housing, and to engage said conducting means thereof, said contact being coupled to the opposing pole of the rechargeable battery whereby said rechargeable battery may be recharged by an external power source in contact with said cover-cap and said contact, said tubular portion having dimensions too small to receive a single-use battery to prevent accidental recharging thereof, and a second battery cover cap having an inner conducting member imbedded in a non-conducting body wherein said inner member provides electrical continuity between one pole of the single-use battery and said conducting means on said housing, said inner conducting member being insulated from the outside of said housing to prevent electrical continuity to said battery by an external power source.

3. In a portable radio receiver adapted for operation from a self-contained unidirectional power source; an elongated housing for enclosing said receiver, said housing including a cylindrical compartment extending lengthwise along one of the sides of said housing and having an opening from the bottom side, said compartment adapted to interchangeably receive both a rechargeable battery of a first diameter and a single-use battery having a diameter larger than that of said rechargeable battery, and means for recharging said rechargeable battery while within said housing, said means including a battery cap-cover of conducting material having opposing side flanges and an extended tubular portion, a notched conducting plate internally positioned around said opening and bonded thereto, and a conducting terminal disposed adjacent said housing opening and projecting inwardly through said housing, said cap-cover being rotatably received in said opening with said side flanges cooperating with said notched conducting plate to securely lock the battery within said housing, said extended tubular portion having internal dimensions to receive a portion of said rechargeable battery, with said dimensions being too small to receive said single-use battery, said conducting plate and said conducting terminal being electrically connected to opposing poles of said rechargeable battery to permit recharging thereof from an external power source.

4. In a subminiature radio receiver adapted for operation from a self-contained unidirectional power source; an elongated housing member for enclosing said receiver including a formed compartment extending lengthwise along one of the sides of said housing member and having an opening at the bottom side, said formed compartment interchangeably receiving both a rechargeable battery of a first diameter and a single-use type battery having a diameter larger than that of said rechargeable battery, first and second battery cap-covers having side flanges with said first cap-cover having an extended tubular portion, said tubular portion having internal dimensions adapted to receive a portion of said rechargeable battery with said dimensions being too small to receive said single-use battery, a notched conducting plate internally positioned around said opening and bonded to said housing member, said cap-covers being rotatably received within said opening with said side flanges cooperating with said notches of said conducting plate to securely lock said batteries within said housing member, and means operative to permit recharging of said rechargeable battery from an external power source including a conducting terminal disposed adjacent said housing opening and projecting inwardly through said housing member, said first cap-cover being constructed of conducting material and making contact with one pole of the battery and said conducting terminal being electrically connected to the opposing pole, whereby said rechargeable battery may be recharged from an external power source in contact with said first cap-cover and said terminal, said second cap-cover having a non-conducting body with a conducting member imbedded therein for making connection with one pole of the single-use battery, said conducting member being insulated from the outside of said housing to prevent inadvertent recharging of said single-use battery.

No references cited.